US011079043B2

(12) United States Patent
Hattori (10) Patent No.: US 11,079,043 B2
(45) Date of Patent: Aug. 3, 2021

(54) CABLE SUPPORTING DEVICE

(71) Applicant: CHUO HATSUJO KABUSHIKI KAISHA, Nagoya (JP)

(72) Inventor: Atsuhiko Hattori, Nagoya (JP)

(73) Assignee: CHUO HATSUJO KABUSHIKI KAISHA, Nagoya (JP)

( * ) Notice: Subject to any disclaimer, the term of this patent is extended or adjusted under 35 U.S.C. 154(b) by 50 days.

(21) Appl. No.: 16/574,423

(22) Filed: Sep. 18, 2019

(65) Prior Publication Data

US 2020/0088321 A1 Mar. 19, 2020

(30) Foreign Application Priority Data

Sep. 19, 2018 (JP) .............................. JP2018-174555

(51) Int. Cl.
*F16L 3/12* (2006.01)
*F16L 3/18* (2006.01)
*F16F 1/12* (2006.01)

(52) U.S. Cl.
CPC .............. *F16L 3/1218* (2013.01); *F16L 3/18* (2013.01); *F16F 1/12* (2013.01)

(58) Field of Classification Search
CPC ... F16L 3/1218; F16L 3/18; F16F 1/12; Y10T 403/32827; Y10T 403/32991; Y10T 403/602; F16B 12/2009; F16B 21/00; F16B 21/16; F16B 2/065; F16B 5/0275; F16B 7/18
USPC ......... 248/49, 56, 62, 65, 68.1, 70, 73, 74.4, 248/74.1, 75; 403/146, 166, 327, 316, 403/299; 285/24, 33, 34, 36, 80, 89, 92, 285/146.1, 268, 269, 331, 391, 398, 399; 74/502.4

See application file for complete search history.

(56) References Cited

U.S. PATENT DOCUMENTS

| 4,144,831 A | * | 3/1979 | Heydolph | ............... B63B 21/00 114/230.18 |
| 4,339,213 A | * | 7/1982 | Gilmore | .................. F16C 1/105 403/316 |
| 5,347,882 A | * | 9/1994 | Klotz | ...................... F16C 1/105 248/65 |
| 5,566,048 A | * | 10/1996 | Esterberg | .............. G06F 1/1616 16/307 |

(Continued)

FOREIGN PATENT DOCUMENTS

JP 4212832 B2 1/2009

*Primary Examiner* — Christopher Garft
*Assistant Examiner* — Michael McDuffie
(74) *Attorney, Agent, or Firm* — Lucas & Mercanti, LLP (57) ABSTRACT

A cable supporting device can suppress a coil spring from protruding toward an inner circumferential side of a tubular portion of a main body, and can apply, to a nut member, a rotational force in a direction toward a stopper. The cable supporting device includes: a main body including a tubular portion in which a through hole is formed and on which an external thread is formed; a nut member; a stopper arranged on one side in the first direction with respect to the external thread and opposed to the nut member; and a coil spring applying, to the nut member, a rotational force in a direction approaching the stopper. An engagement portion that engages a first end portion of the coil spring is formed in the nut member, and an insertion groove is formed on the outer circumferential surface of the tubular portion.

16 Claims, 9 Drawing Sheets

(56) References Cited

U.S. PATENT DOCUMENTS

| | | | |
|---|---|---|---|
| 6,340,265 B1 | 1/2002 | Suzuki et al. | |
| 6,490,947 B2 * | 12/2002 | Burger | F16C 1/105 |
| | | | 248/56 |
| 6,725,739 B2 * | 4/2004 | Bannon | B62D 1/184 |
| | | | 280/775 |
| 9,438,089 B2 * | 9/2016 | Perisho | H02K 15/0006 |
| 9,926,967 B2 * | 3/2018 | Kawai | F16B 21/186 |
| 10,465,742 B2 * | 11/2019 | Estrada | F16C 1/102 |
| 2011/0097141 A1 * | 4/2011 | Brown | F16L 37/0885 |
| | | | 403/286 |

* cited by examiner

CABLE SUPPORTING DEVICE

CROSS-REFERENCE TO RELATED APPLICATION

This Application claims the benefit of priority of Japanese Patent Application No. JP2018-174555 filed on Sep. 19, 2018, the contents of which are incorporated herein by reference.

FIELD OF THE INVENTION

The present invention relates to a cable supporting device for supporting a cable.

BACKGROUND OF THE INVENTION

Heretofore, a cable supporting device for supporting a cable such as a control cable for a vehicle or the like is known. The cable supporting device has a main body, an annular nut member, a stopper, and a coil spring. A through hole into which a cable is inserted is formed in the main body, and an external thread is formed on an outer circumferential surface of the main body. An internal thread that is screwed with the external thread formed on the main body is formed on an inner circumferential surface of the nut member. The stopper is arranged on a side of the external thread formed on the main body, with the stopper arranged in an axial direction of the above-mentioned through hole, and is opposed to the nut member in the axial direction. The coil spring is arranged in such a manner that the main body is received on an inner circumferential side of the coil spring, and applies, to the nut member, a rotational force in a direction toward the stopper. One end portion of the coil spring is engaged with a slit (cut) formed in the nut member, and the other end portion of the coil spring is engaged with a slit formed in the main body in such a manner as to communicate with the through hole.

SUMMARY OF THE INVENTION

In this specification a cable supporting device for supporting a cable is disclosed and includes: a main body including a tubular portion, wherein a through hole into which the cable is inserted and which extends in a first direction is formed in the tubular portion, and an external thread is formed on a part of an outer circumferential surface of the tubular portion; an annular nut member having an inner circumferential surface on which an internal thread screwed with the external thread formed on the tubular portion is formed; a stopper arranged on one side in the first direction with respect to the external thread formed on the tubular portion, and opposed to the nut member in the first direction; and a coil spring arranged in such a manner that the tubular portion is received on an inner circumferential side thereof and the coil spring applies, to the nut member, a rotational force in a direction toward the stopper; wherein an engagement portion that engages a first end portion of the coil spring is formed in the nut member, and an insertion groove is formed on the outer circumferential surface of the tubular portion and on the other side of the external thread in the first direction, a second end portion of the coil spring on a side opposite to the first end portion is inserted into the insertion groove, and the insertion groove at least has an abutting surface that abuts against the second end portion of the coil spring when the nut member screwed with the tubular portion is rotated in a direction away from the stopper.

DESCRIPTION OF REFERENCE NUMERALS

1: cable, 100: cable supporting device, 102: cover portion, 104: nut member, 106: coil spring, 108: locking member, 109: sleeve, 109A: spherical portion, 110, 110a: tubular portion, 112: through hole, 114: external thread, 116, 116a: insertion groove, 117: engagement opposing surface, 118, 118a: guide groove, 119, 119a: abutting surface, 120: stopper, 122: lock guide groove, 124: stopper-side opposing surface, 130: hub, 140: internal thread, 142: slit, 144: knurl, 146: nut-side opposing surface, 160: first end portion, 162: second end portion, 180: arm portion, 182: connecting portion, 184: engagement recess, 186: protruding portion, 600: bracket, 610: recess, 612: mounting recess, 614: guiding recess, 620: opposing portion, B: dividing line, C1 C2, C3: side wall, L: imaginary straight line.

DETAILED DESCRIPTION OF THE INVENTION

Problems to be Solved by the Present Disclosure

In the prior cable supporting device described above, a part of the coil spring is engaged with the slit formed in the main body in such a manner as to communicate with the through hole. Therefore, a part of the coil spring protrudes to the inner circumferential side (into the through hole) of the main body. If a part of the coil spring protrudes into the through hole, there may be, for example, a deficiency that the part of the coil spring interferes with an insertion member (for example, a cable or a sleeve covering the cable or the like) to be inserted into the through hole such that the insertion member is damaged, or the insertion member cannot be inserted into the through hole.

In this specification, a technology at least capable of solving some of the above problems is disclosed.

Means for Solving the Problems

The technology disclosed in this specification can be implemented in the following manner.

A. Embodiment

A-1. Structure of Cable Supporting Device 100

Figure 1:
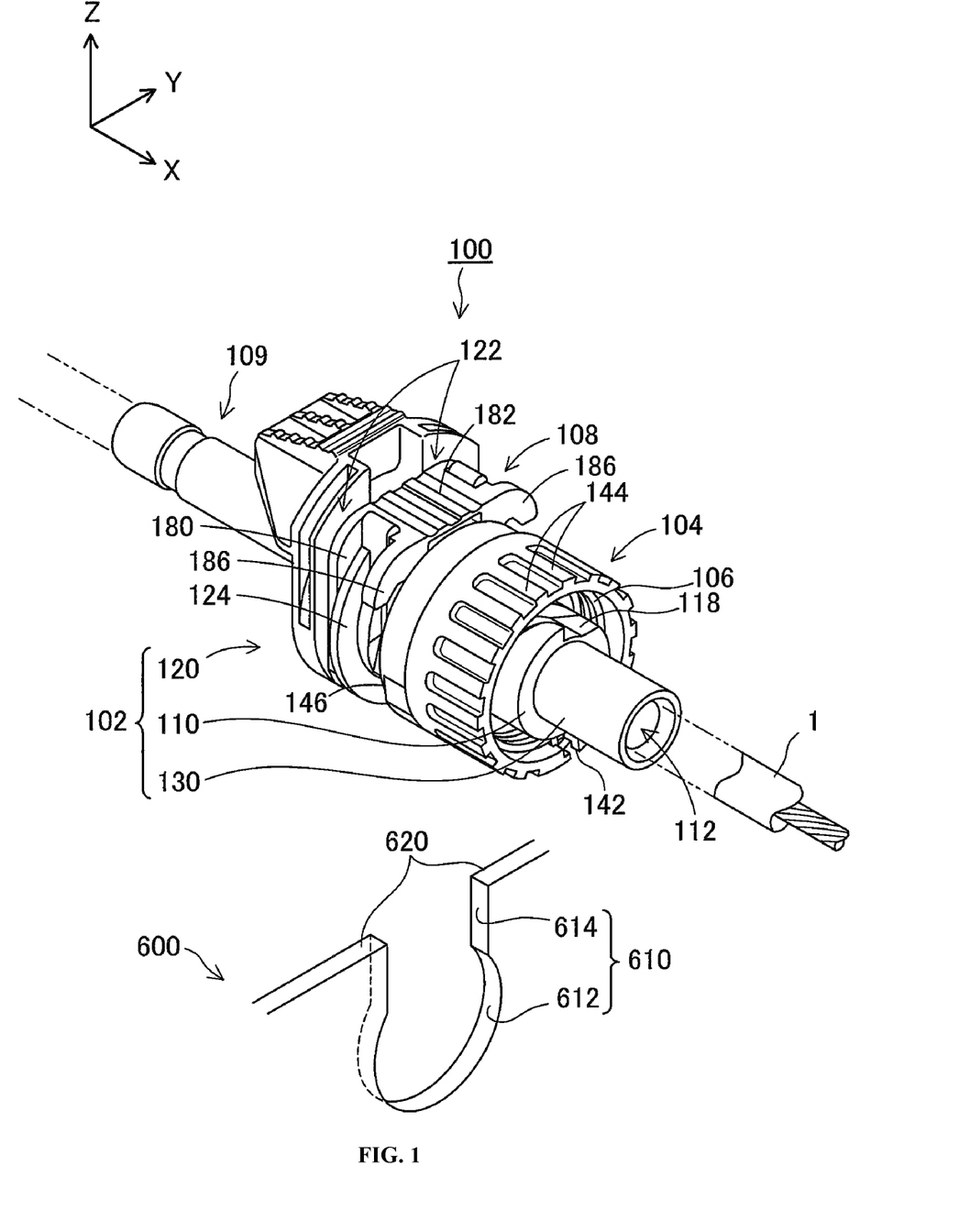
FIG. 1 is a perspective view showing appearance and structure of a cable supporting device 100 of the present embodiment.
Figure 2:
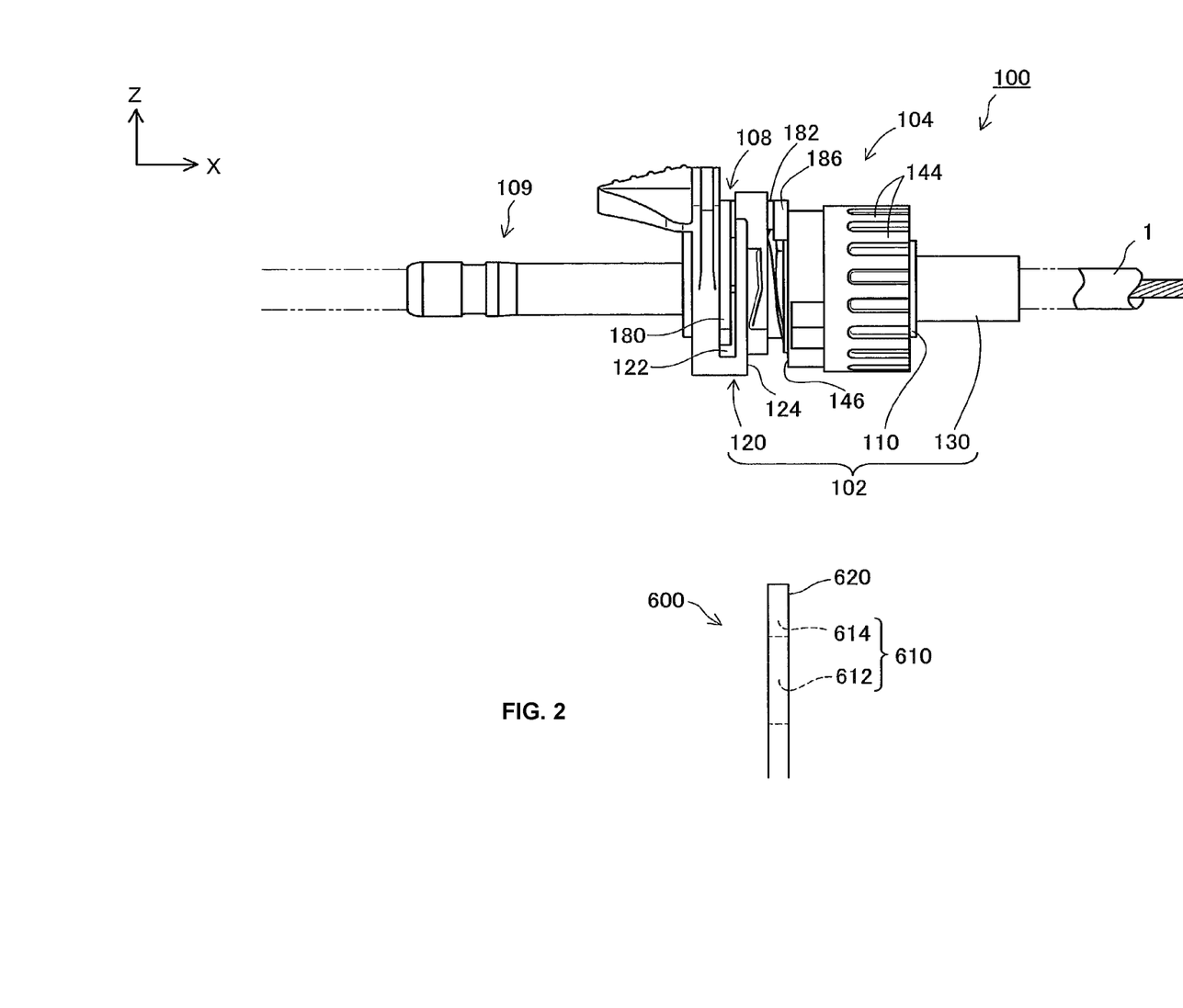
FIG. 2 is a schematic view showing the structure of the cable supporting device 100 of FIG. 1 in an XZ plane.
Figure 3:
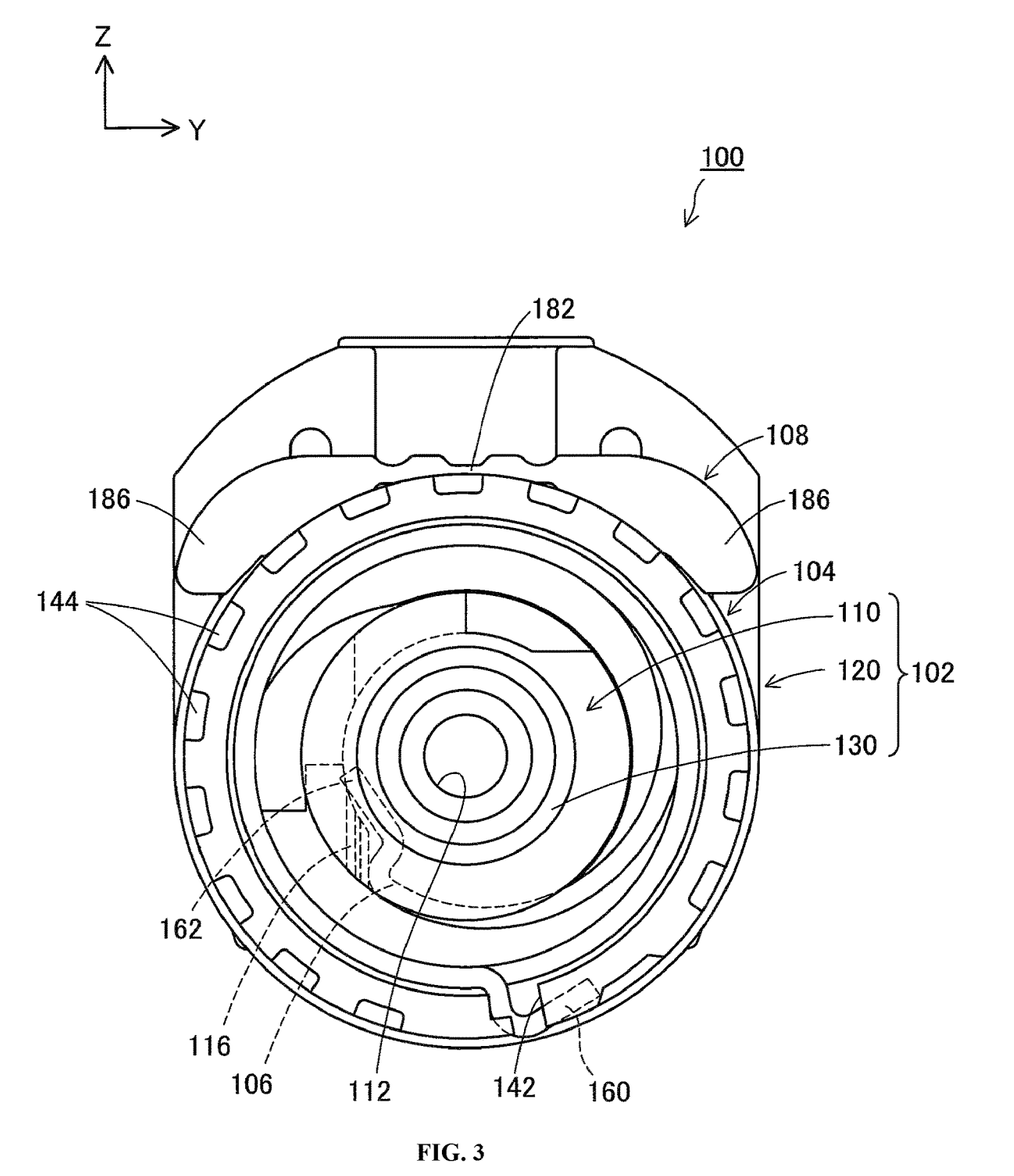
FIG. 3 is a schematic view showing the structure of the cable supporting device 100 of FIG. 1 in a YZ plane.
Figure 4:
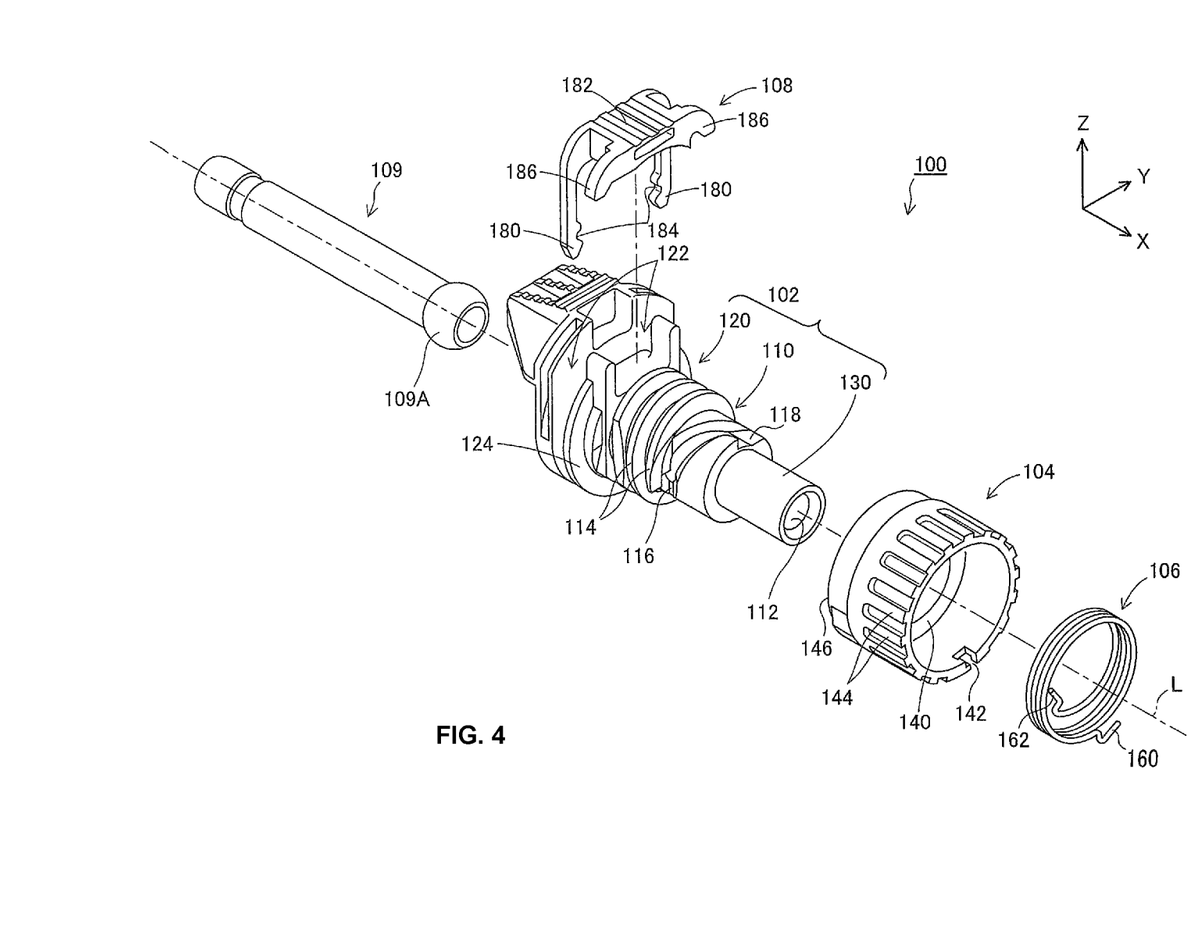
FIG. 4 is a perspective view showing a state in which the cable supporting device 100 is disassembled.

FIG. 1 is a perspective view showing appearance and structure of a cable supporting device 100 of the present embodiment, and a state before the cable supporting device 100 is mounted on a bracket 600 is shown in FIG. 1. FIG. 2 is a schematic view showing the structure of the cable supporting device 100 of FIG. 1 in an XZ plane, and FIG. 3 is a schematic view showing the structure of the cable supporting device 100 of FIG. 1 in a YZ plane, wherein in FIG. 3, a part such as a coil spring 106 to be described later is represented by an imaginary line. FIG. 4 is a perspective view showing a state in which the cable supporting device 100 is disassembled. In each of the figures, XYZ axes which are perpendicular to one another and used for determining the directions are shown. In this specification, for the sake of convenience, a positive direction of the Z-axis is set as an upward direction and a negative direction of the Z-axis is set as a downward direction, but in actuality, the cable supporting device 100 may be disposed in an orientation different from the illustrated orientation. The same goes for FIG. 5 and subsequent figures.

The cable supporting device 100 is configured to support a cable 1 and to be mounted on the bracket 600. Specifically, the cable 1 is, for example, a transmission cable for a vehicle. The bracket 600 is disposed on a shift lever device (not illustrated) having a shift lever. A substantially U-shaped recess 610, which is in form of an opening and used for mounting the cable supporting device 100, is formed at an upper end of the bracket 600. The recess 610 includes a mounting recess 612 that is substantially circular as viewed from a specified direction (the X-axis direction, hereinafter also referred to as the "cable insertion direction") and a guiding recess 614 extending from the upper end of the bracket 600 to the mounting recess 612 in an upward and downward direction (the Z-axis direction). A width between a pair of opposing portions 620 in the recess 610 that are opposed to each other and constitute the guiding recess 614 (an opening width of the recess 610 in the Y-axis direction) is smaller than the diameter of the mounting recess 612. One end side of the cable 1 is connected to a transmission (not illustrated), and the other end side of the cable is supported by the cable supporting device 100 mounted on the bracket 600 and is connected to a shift lever. According to such structure, the transmission and the shift lever are connected in a linked manner by the cable 1.

As shown in FIG. 1 to FIG. 4, the cable supporting device 100 includes a cover portion 102, a nut member 104, a coil spring 106, a locking member 108, and a sleeve 109.

Structure of Cover Portion 102

The cover portion 102 includes a tubular portion 110, a stopper 120, and a hub 130. As shown in FIG. 4, the tubular portion 110 is a tubular part in which a through hole 112 extending linearly in the cable insertion direction (the X-axis direction) is formed. An external thread 114 is formed on an outer circumferential surface of the tubular portion 110. The stopper 120 is an annular part and is arranged on one side in the cable insertion direction (the negative direction side in the X-axis, hereinafter referred to as the "rear side") with respect to the external thread 114 formed on the tubular portion 110. The outer diameter of the stopper 120 is larger than the outer diameter of the tubular portion 110, and the outline of the stopper 120 is located outside the outline of the tubular portion 110 over the entire circumference as viewed from the cable insertion direction. In other words, the stopper 120 protrudes toward the outside of the tubular portion 110 over the entire circumference as viewed from the cable insertion direction. Further, on both sides of the stopper 120 in a direction (the Y-axis direction) perpendicular to a central axis of the through hole 112, a pair of lock guide grooves 122 extending in the upward and downward direction (the Z-axis direction) are formed. In addition, protrusions (not illustrated) are formed in the respective lock guide grooves 122.

Structure of Hub 130

The hub 130 has a cylindrical shape and is arranged on the other side in the cable insertion direction (a positive direction side in the X-axis, hereinafter referred to as the "front side") with respect to the external thread 114 formed on the tubular portion 110. The hub 130 and the tubular portion 110 are arranged such that the central axis of the hub 130 and the central axis of the through hole 112 of the tubular portion 110 are located on substantially the same imaginary straight line L (see FIG. 4). Further, the outer diameter of the hub 130 is smaller than the outer diameter of the tubular portion 110. An end portion of the hub 130 on the rear side is integrally molded with the through hole 112 of the tubular portion 110. In addition, the tubular portion 110 and the stopper 120 are formed of, for example, resin (for example, resin containing glass), and the hub 130 is formed of, for example, metal.

Structure of Nut Member 104

The nut member 104 is an annular member, and an internal thread 140 is formed on an inner circumferential surface of the nut member 104 (see FIG. 4). The internal thread 140 of the nut member 104 is screwed with the external thread 114 formed on the tubular portion 110 of the cover portion 102. Further, as shown in FIG. 2, an end surface of the nut member 104 on the rear side (hereinafter referred to as the "nut-side opposing surface 146") is opposed to an end surface of the stopper 120 on the front side (hereinafter referred to as the "stopper-side opposing surface 124") in the cable insertion direction. Thus, when the nut member 104 is rotated, the distance between the nut-side opposing surface 146 and the stopper-side opposing surface 124 changes. In addition, knurls 144 are formed on an outer circumferential surface of the nut member 104. The nut member 104 is formed of, for example, resin (for example, resin containing glass).

Structure of Coil Spring 106

As shown in FIG. 1, FIG. 3, and FIG. 4, the coil spring 106 is arranged such that the tubular portion 110 of the cover portion 102 is received on an inner circumferential side of the coil spring 106. Specifically, the coil spring 106 is arranged to be interposed between the tubular portion 110 and the nut member 104 as viewed from the cable insertion direction (the X-axis direction). A rotational force in a direction toward the stopper 120 (the negative direction of the X-axis) is applied to the nut member 104 by the coil spring 106.

Structure of Locking Member 108

As shown in FIG. 4, the locking member 108 includes a pair of arm portions 180 extending in the upward and downward direction (the Z-axis direction) and a connecting portion 182 that connects upper end portions of the pair of arm portions 180 to each other. The locking member 108 is formed of, for example, resin and is elastically deformable.

The pair of arm portions 180 can be inserted in the upward and downward direction and inserted into the pair of lock guide grooves 122 formed on the stopper 120, respectively. Thus, the locking member 108 can be moved between a locked position where a lower surface of the connecting portion 182 is brought into contact with the stopper 120 (see FIG. 1 and FIG. 2) and a lock release position where the lower surface of the connecting portion 182 is separated upward from the stopper 120 (see FIG. 7 and FIG. 8 described later).

As shown in FIG. 4, an engagement recess 184 is formed on a surface of each arm portion 180 of the locking member 108, with the surface opposed to the arm portion 180 on the other side. When the locking member 108 is at the lock release position, the engagement recess 184 formed in each arm portion 180 is fitted with the above-mentioned protrusion formed on the respective lock guide groove 122, whereby the locking member 108 is temporarily held in the lock release position. The connecting portion 182 is formed in such a manner as to protrude from the arm portions 180 toward the nut member 104 side (the front side). Further, a pair of protruding portions 186 respectively protruding toward both sides of the cover portion 102 in the circumferential direction are formed on the connecting portion 182.

Structure of Sleeve 109

The sleeve 109 is a cylindrical member and is formed of, for example, resin. The sleeve 109 is arranged on the rear side of the through hole 112 of the cover portion 102 (a side opposite to the hub 130). As shown in FIG. 4, a spherical portion 109A is formed at one end of the sleeve 109, and the spherical portion 109A is inserted into the through hole 112 of the cover portion 102. Thus, the sleeve 109 is supported by the cover portion 102 so as to be tiltable about the spherical portion 109A.

A-2. Structure for Engaging the Coil Spring 106

Figure 5:
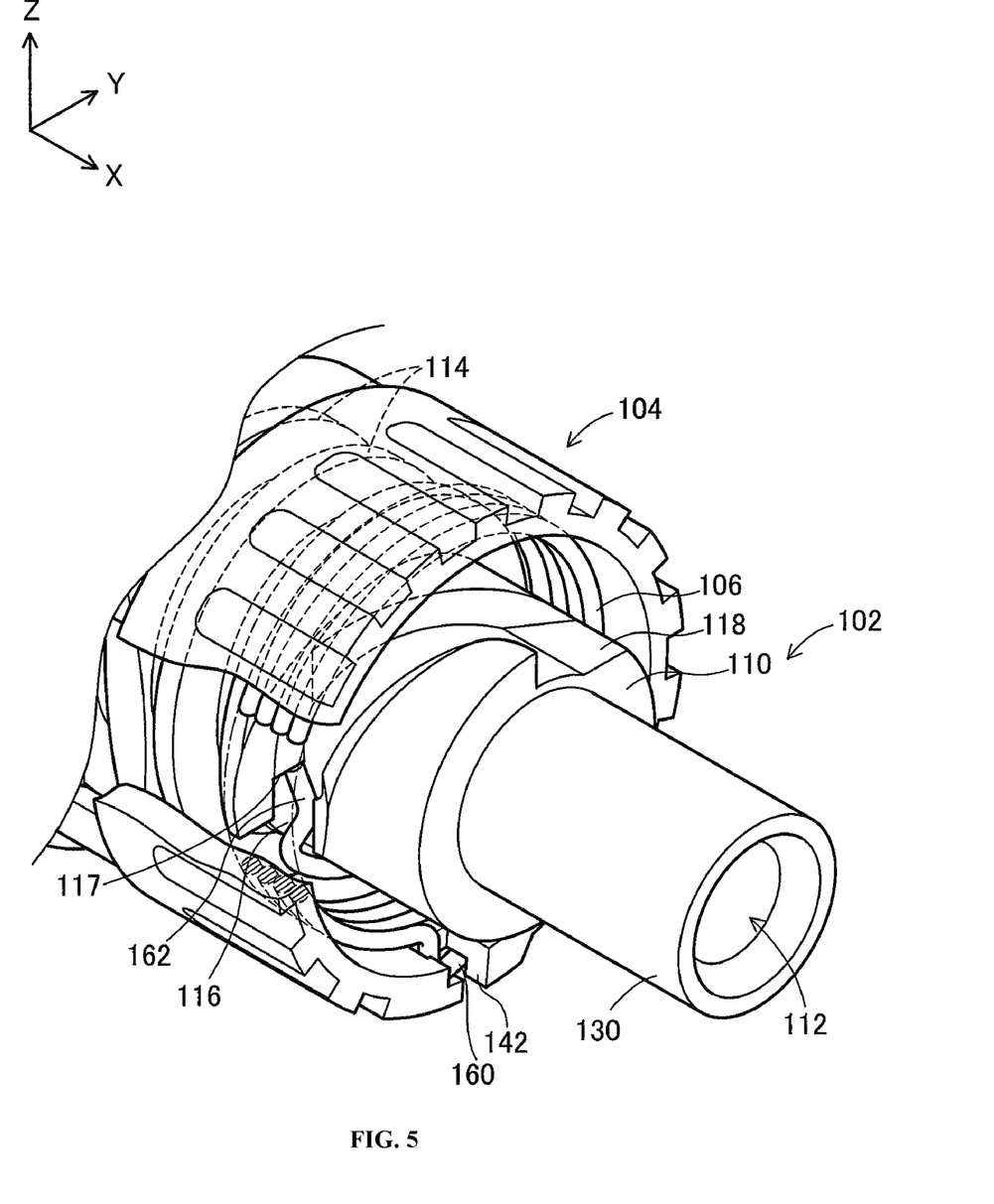
FIG. 5 is a perspective view showing a structure assembled by a part of a cover portion 102 (a tubular portion 110 and a hub 130), a nut member 104, and a coil spring 106.
Figure 6:
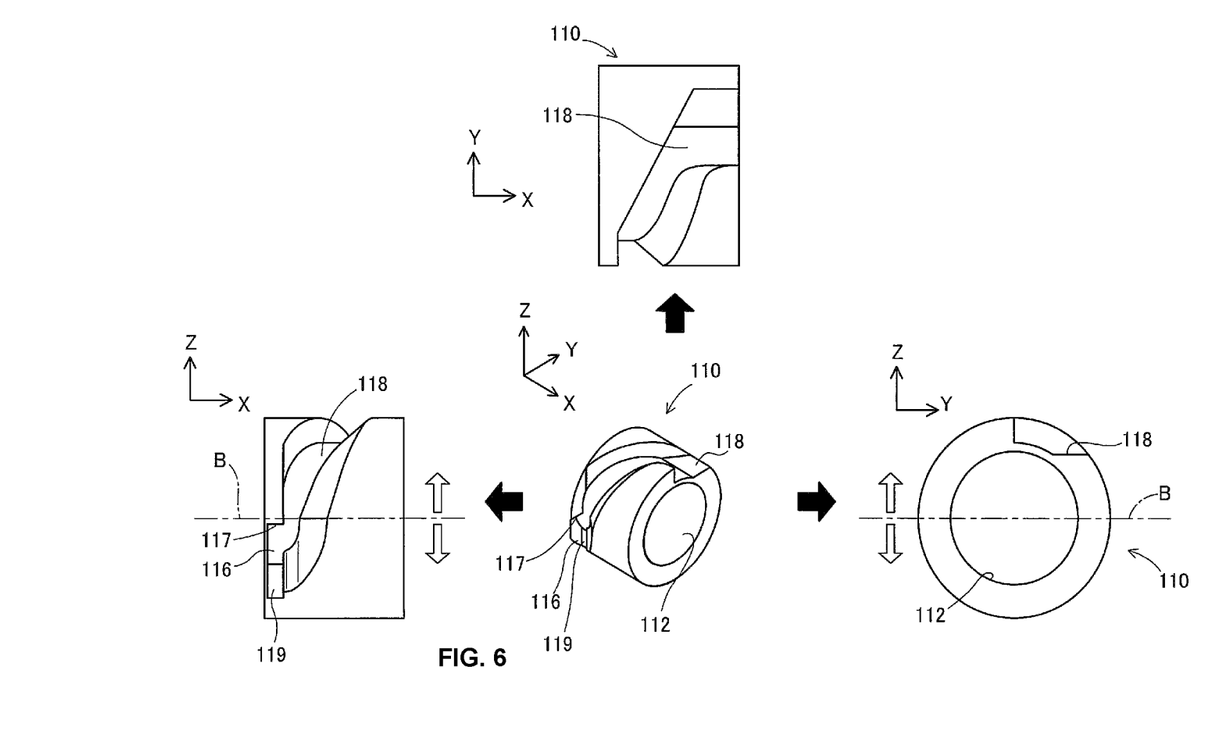
FIG. 6 is a schematic view showing the structure of the tubular portion 110 of the cover portion 102.

FIG. 5 is a perspective view showing a structure assembled by a part of the cover portion 102 (the tubular portion 110 and the hub 130), the nut member 104, and the coil spring 106. In FIG. 5, a part of each of the tubular portion 110 and the coil spring 106 is represented by broken lines, and a part of each of the nut member 104 and the coil spring 106 is omitted. FIG. 6 is a schematic view showing the structure of the tubular portion 110 of the cover portion 102. A perspective view of the tubular portion 110 is shown in the lower central portion of FIG. 6, a structure, in a YZ plane, (a front view) of the tubular portion 110 is shown on the right side, a structure, in an XZ plane, (a left side view) of the tubular portion 110 is shown on the left side, and a structure, in an XY plane, (a top view) of the tubular portion 110 is shown in the upper central portion.

Structure for Engaging the Coil Spring 106 with the Nut Member 104

As shown in FIG. 3 to FIG. 5, a first end portion 160 of the coil spring 106 is curved in such a manner as to protrude toward the outer circumferential side of the coil spring 106 as viewed from the cable insertion direction (the X-axis direction). On the other hand, a slit 142 is formed at an end portion of the nut member 104 on the front side (a side opposite to the stopper 120). The first end portion 160 of the coil spring 106 is engaged by the slit 142 formed on the nut member 104.

Structure for Engaging the Coil Spring 106 with the Cover Portion 102

A second end portion 162 of the coil spring 106 is curved in such a manner as to protrude toward the inner circumferential side of the coil spring 106 as viewed from the cable insertion direction (the X-axis direction). On the other hand, as shown in FIG. 4 to FIG. 6, an insertion groove 116 and a guide groove 118 are formed in the tubular portion 110 of the cover portion 102. The insertion groove 116 is engaged with the second end portion 162 of the coil spring 106. The guide groove 118 guides the second end portion 162 of the coil spring 106 into the insertion groove 116. The details will be described below.

In the cover portion 102, the external thread 114 is formed on a part of the outer circumferential surface of the tubular portion 110, and the insertion groove 116 is formed on the front side of the external thread 114 (the side opposite to the stopper 120) on the outer circumferential surface of the tubular portion 110. The insertion groove 116 has an abutting surface 119, and the abutting surface 119 abuts against the second end portion 162 of the coil spring 106 when the nut member 104 screwed with the tubular portion 110 is rotated in a direction away from the stopper 120. Specifically, the abutting surface 119 is opposed to and abuts against the second end portion 162 of the coil spring 106 in a direction in which the nut member 104 is released. In addition, the insertion groove 116 further has an engagement opposing surface 117 opposed to the abutting surface 119 in the circumferential direction of the tubular portion 110 (see the left diagram of FIG. 6). Therefore, a movement of the second end portion 162 of the coil spring 106 in the circumferential direction is restricted by arranging the second end portion 162 of the coil spring 106 between the engagement opposing surface 117 and the abutting surface 119 in the circumferential direction of the tubular portion 110.

The guide groove 118 is formed on the front side of the insertion groove 116 (the side opposite to the stopper 120) on the outer circumferential surface of the tubular portion 110. The guide groove 118 continuously extends from the insertion groove 116 to the end portion of the tubular portion 110 on the front side, and has an opening at the front side of the tubular portion 110. The shape of the guide groove 118 is spiral (or helical), and a winding direction of the guide groove 118 is opposite to a winding direction of the external thread 114 formed on the outer circumferential surface of the tubular portion 110. Further, an angle of inclination of the guide groove 118 with respect to the imaginary straight line L (the axis of the through hole 112) is smaller than an angle of inclination of the external thread 114 (the internal thread 140) with respect to the imaginary straight line L as viewed from a direction (for example, the Y-axis direction) perpendicular to the cable insertion direction (the X-axis direction). Further, the number of windings of the guide groove 118 is smaller than the number of windings of the external thread 114. For example, the number of windings of the guide groove 118 is less than or equal to ¼ of the number of windings of the external thread 114. Therefore, when the second end portion 162 of the coil spring 106 is guided into the insertion groove 116, the number of rotations of the nut member 104 can be reduced as compared with a case where the number of windings of the guide groove 118 is larger than ¼ of the number of windings of the external thread 114. Further, it is preferable that the number of windings of the guide groove 118 is greater than or equal to ¼ of that of the circumference of the tubular portion 110 and less than or equal to ½ of that of the circumference of the tubular portion 110. Thus, the second end portion 162 of the coil spring 106 can be guided into the insertion groove 116 smoothly and efficiently.

Further, as shown in the upper central portion and the left side of FIG. 6, the insertion groove 116 and the guide groove 118 are shaped such that the entire bottom surface of a part of the guide groove 118 and the insertion groove 116 (specifically a part of the guide groove 118) can be visually recognized when viewed from one side (the upper side) in the upward and downward direction (the Z-axis direction). Further, the insertion groove 116 and the guide groove 118 are shaped such that the entire bottom surface of a remaining part of the guide groove 118 and the insertion groove 116 (specifically a part of the guide groove 118 and the insertion groove 116) can be visually recognized when viewed from the other side (the lower side) in the upward and downward direction (the Z-axis direction).

A-3. Relation Between the Tubular Portion 110 and the Stopper 120

In the cable supporting device 100, the tubular portion 110 and the stopper 120 are integrally formed of the same material.

In addition, the cable insertion direction (the X-axis direction) is equivalent to the first direction in the claims, and the structure assembled by the tubular portion 110 and the hub 130 is equivalent to a main body in the claims. The slit 142 is equivalent to an engagement portion in the claims. The upward and downward direction (the Z-axis direction) is equivalent to a second direction in the claims.

A-4. Assembly Process and Mounting Process of the Cable Supporting Device 100

Figure 7:
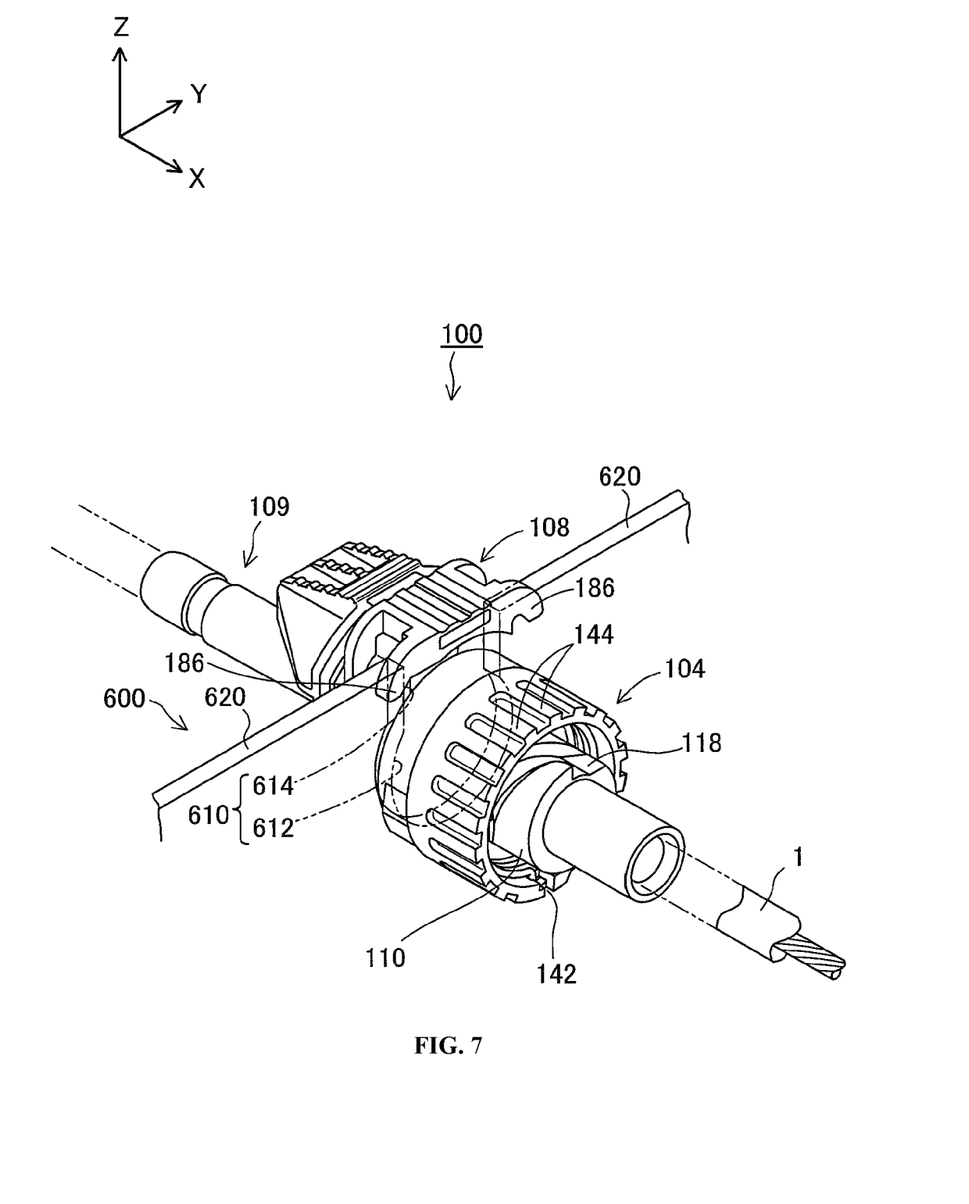
FIG. 7 is a perspective view showing the appearance and structure of the cable supporting device 100.
Figure 8:
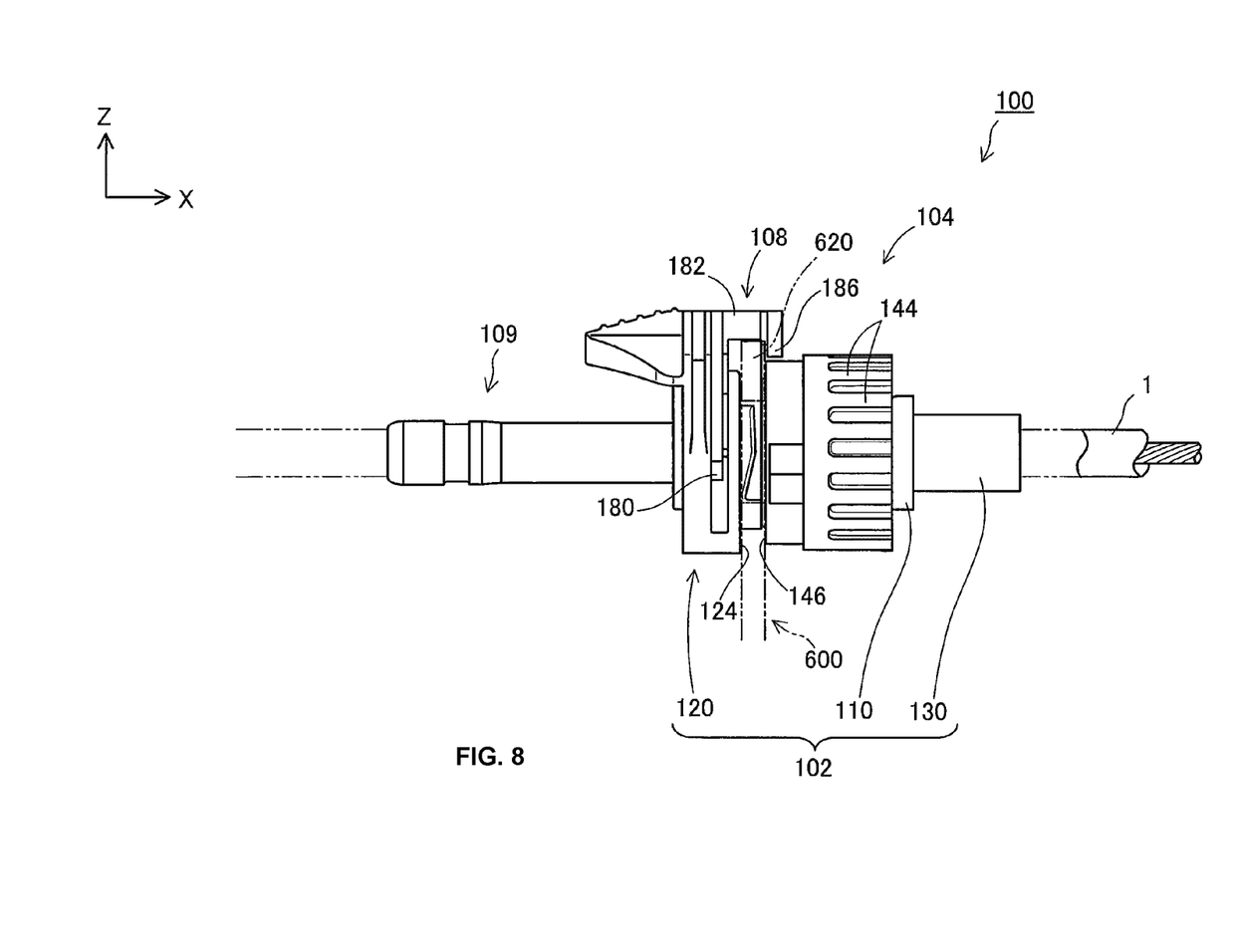
FIG. 8 is a schematic view showing the structure of the cable supporting device 100 of FIG. 7 in the XZ plane.

FIG. 7 is a perspective view showing the appearance and structure of the cable supporting device 100 of the present embodiment, and FIG. 7 shows a state in which the cable supporting device 100 is mounted on the bracket 600. FIG. 8 is a schematic view showing the structure of the cable supporting device 100 of FIG. 7 in the XZ plane.

In the cable supporting device 100, an assembly process for mounting the nut member 104, the coil spring 106, and the locking member 108 to the cover portion 102 is described as follows. For example, the nut member 104 is screwed with the tubular portion 110 of the cover portion 102. Further, the locking member 108 is arranged on the stopper 120 of the cover portion 102 so as to be located at the lock release position.

Next, the coil spring 106 is arranged between the nut member 104 and the tubular portion 110. Specifically, the first end portion 160 of the coil spring 106 is not engaged with the slit 142 of the nut member 104, and the second end portion 162 of the coil spring 106 is inserted from the guide groove 118 formed in the tubular portion 110. The second end portion 162 of the coil spring 106 is guided into the insertion groove 116 along the guide groove 118, and is engaged between the engagement opposing surface 117 and the abutting surface 119. Then, the first end portion 160 of the coil spring 106 is engaged with the slit 142 of the nut member 104. Thus, a rotational force in a direction toward the stopper 120 (the negative direction of the X-axis) is applied to the nut member 104 by the coil spring 106. The nut member 104 is moved against the rotational force and in a direction away from the stopper 120, so that the locking member 108 is lowered downward (in the negative direction of the Z-axis), and the connecting portion 182 is interposed between the nut-side opposing surface 146 and the stopper 120. Thus, the assembly process of the cable supporting device 100 is completed.

An operating process for mounting the cable supporting device 100 supporting a cable 1 on the bracket 600 is described as follows. Firstly, the cable 1 is inserted into the through hole 112 of the cover portion 102 included in the cable supporting device 100. Then, the nut member 104 is rotated in the direction away from the stopper 120 against an acting force from the coil spring 106, so that a separated distance between the nut-side opposing surface 146 of the nut member 104 and the stopper-side opposing surface 124 of the stopper 120 is larger than a width dimension of the connecting portion 182 of the locking member 108 in the frontward and rearward direction (the X-axis direction). In the state where the separated distance between the nut-side opposing surface 146 and the stopper-side opposing surface 124 is larger than the width dimension of the connecting portion 182, the locking member 108 is moved from the lock release position to the locked position. Then, the hand is moved away from the nut member 104, such that the nut member 104 is rotated in the direction toward the stopper 120 by the acting force from the coil spring 106. As a result, as shown in FIG. 1 and FIG. 2, the connecting portion 182 of the locking member 108 is sandwiched between the nut-side opposing surface 146 of the nut member 104 and the stopper-side opposing surface 124 of the stopper 120. At this time, the separated distance between the nut-side opposing surface 146 and the stopper-side opposing surface 124 is larger than a thickness dimension of the bracket 600.

Then, a part of the cable supporting device 100 between the nut-side opposing surface 146 and the stopper-side opposing surface 124 is inserted into the recess 610 of the bracket 600. During this process, the lower surfaces of the protruding portions 186 of the locking member 108 abut against and are pushed up by the upper surfaces of the pair of opposing portions 620 of the bracket 600, respectively, whereby the locking member 108 is moved from the locked position to the lock release position. Thus, the locking member 108 is not interposed between the nut-side opposing surface 146 and the stopper-side opposing surface 124. As a result, the nut member 104 is rotated in the direction toward the stopper 120 by the acting force from the coil spring 106, and the bracket 600 is sandwiched between the nut-side opposing surface 146 and the stopper-side opposing surface 124. Thus, the cable supporting device 100 is mounted on the bracket 600.

A-5. Effects of the Present Embodiment

As described above, in the cable supporting device 100 of the present embodiment, the first end portion 160 of the coil spring 106 is engaged by the slit 142 formed on the nut member 104, and the second end portion 162 of the coil spring 106 is inserted into the insertion groove 116 formed on the outer circumferential surface of the tubular portion 110 of the cover portion 102. That is to say, the coil spring 106 does not protrude toward the inner circumferential side of the tubular portion 110. When the nut member 104 screwed with the tubular portion 110 is rotated in the direction away from the stopper 120, the second end portion 162 of the coil spring 106 abuts against the abutting surface 119 formed in the insertion groove 116. Thus, the coil spring 106 is torsionally deformed, and a rotational force in a direction toward the stopper 120 is applied to the nut member 104 by a resilience force from the coil spring. In this way, according to the present embodiment, the coil spring 106 can be suppressed from protruding toward the inner circumferential side of the tubular portion 110, and a rotational force in the direction toward the stopper 120 can be applied to the nut member 104.

Further, in the present embodiment, a guide groove 118 continuously extending from an end portion of the tubular portion 110 on the front side to the insertion groove 116 is formed in the outer surface of the tubular portion 110. The guide groove 118 continuously extends from the insertion groove 116 to the other side of the tubular portion 110 in the cable insertion direction and has an opening on the other side. Thus, when the coil spring 106 and the nut member 104 are to be assembled to the cover portion 102, the second end portion 162 of the coil spring 106 can be smoothly guided into the insertion groove 116 from the end portion of the tubular portion 110 on the front side via the guide groove 118.

Further, in the present embodiment, the shape of the guide groove 118 is spiral (or helical). Therefore, for example, the second end portion 162 of the coil spring 106 can be suppressed from being detached from the insertion groove 116 or the guide groove 118 in the frontward and rearward direction, as compared with a case where the shape of the guide groove 118 is a linear shape along the frontward and rearward direction (the X-axis direction). Further, the second end portion 162 of the coil spring 106 can be smoothly moved into the insertion groove 116 along the guide groove 118 by only rotating the coil spring 106 from a state in which the second end portion 162 of the coil spring 106 is set in the guide groove 118. Therefore, it is possible to improve the operability engaging the second end portion 162 of the coil spring 106 with the cover portion 102 in a space between the nut member 104 and the tubular portion 11 which can hardly be seen from the outside and in which it is difficult to perform an operation.

Further, an angle of inclination of the guide groove 118 with respect to the imaginary straight line L is smaller than an angle of inclination of the external thread 114 (the internal thread 140) with respect to the imaginary straight line L as viewed from a direction (for example, the Y-axis direction) perpendicular to the cable insertion direction. Therefore, for example, the second end portion 162 of the coil spring 106 can be arranged into the insertion groove 116 efficiently with a small number of rotations, as compared with a structure in which the angle of inclination of the guide groove 118 is equal to or greater than the angle of inclination of the external thread 114 (the internal thread 140).

Further, in the present embodiment, the winding direction of the guide groove 118 is opposite to the winding direction of the external thread 114 formed on the outer circumferential surface of the tubular portion 110. Therefore, according to the present embodiment, for example, it is possible to suppress the occurrence of a case in which a state that the second end portion 162 of the coil spring 106 being inserted into the insertion groove 116 is released when the nut member 104 is rotated in the direction away from the stopper 120, as compared with a structure in which the winding direction of the guide groove 118 is the same as the winding direction of the external thread 114.

Figure 9:
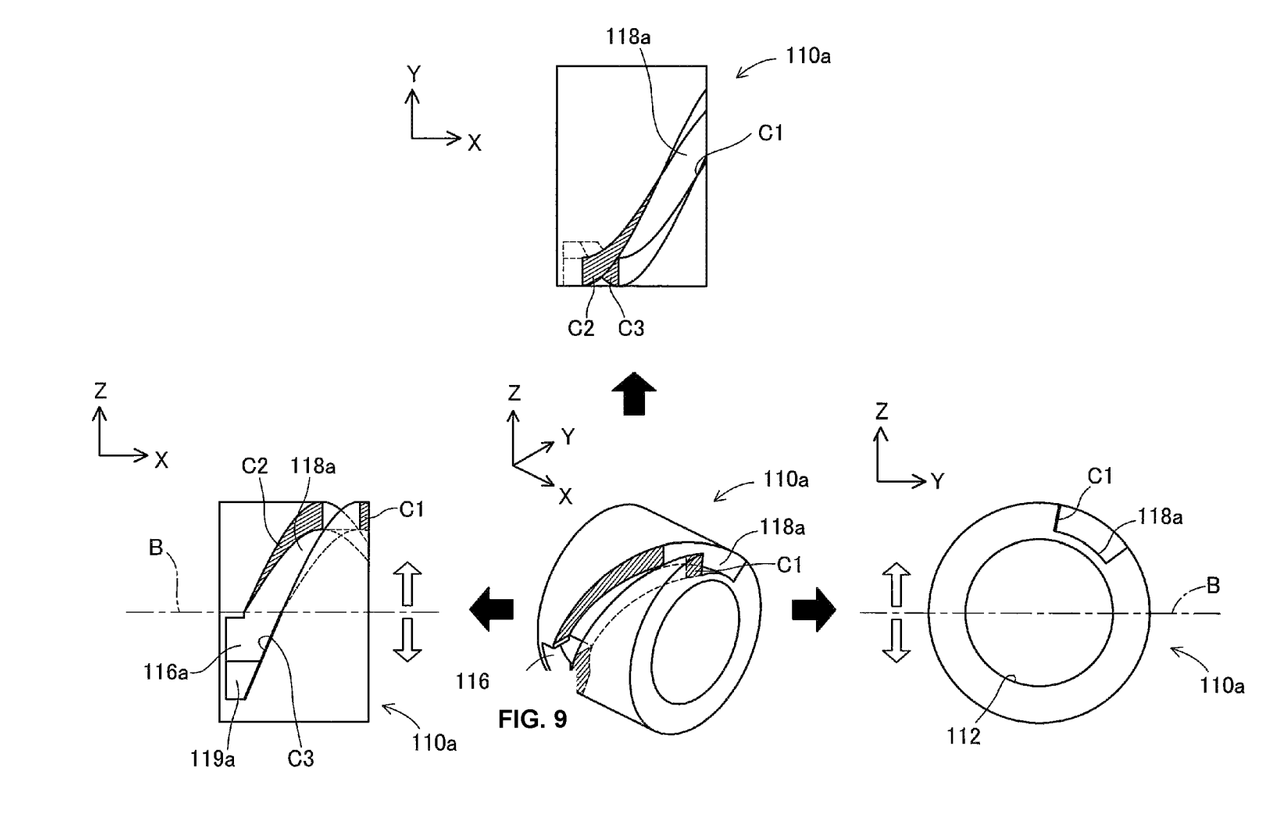
FIG. 9 is a schematic view showing the structure of a tubular portion 110a of a variant example.

FIG. 9 is a schematic view showing the structure of a tubular portion 110a of a variant example. A perspective view of the tubular portion 110a is shown in the lower central portion of FIG. 9, a structure in the YZ plane, (a front view) of the tubular portion 110a is shown on the right side, a structure in the XZ plane, (a left side view) of the tubular portion 110a is shown on the left side, and a structure in the XY plane, (a top view) of the tubular portion 110a is shown in the upper central portion. A guide groove 118a and an insertion groove 116a having an abutting surface 119a and are formed in the outer circumferential surface of the tubular portion 110a of the variant example. The shape of the guide groove 118a is spiral (or helical), and the guide groove 118a has a substantially equal width over the entire length thereof. Further, the insertion groove 116a is constituted by a surface continuously connected to the guide groove 118a. Therefore, in the tubular portion 110a of the variant example, as shown in the upper central portion of FIG. 9, a part of a bottom surface of a groove part of the guide groove 118a that appears on the outer circumferential surface of the tubular portion 110a is blocked by side walls C1 and C2 constituting the guide groove 118a and cannot be visually recognized when viewed from the upper side. Further, a part of the bottom surface of the groove part of the guide groove 118a that appears in the outer circumferential surface of the tubular portion 110a is blocked by a side wall C3 constituting the guide groove 118a and cannot be visually recognized when viewed from the lower side. That is to say, there is an undercut part in the tubular portion 110a of the variant example. Therefore, it is extremely difficult to mold the tubular portion 110 of the variant example using a pair of molds (not illustrated) that are divided into upper and lower portions by using a dividing line B as a boundary.

In contrast, in the present embodiment, as shown in the upper central portion of FIG. 6, the entire bottom surface of a groove part of the guide groove 118 that appears in the outer circumferential surface of the tubular portion 110 can be visually recognized when viewed from the upper side. That is to say, the side walls C1 and C2 of the tubular portion 110a in the variant example are removed. Further, the entire bottom surface of a groove part of the guide groove 118 that appears in the outer circumferential surface of the tubular portion 110 can be visually recognized when viewed from the lower side. That is to say, the side wall C3 of the tubular portion 110a in the variant example is removed. That is to say, there is no undercut part in the tubular portion 110 of the present embodiment. Therefore, it is possible to mold the tubular portion 110 (the cover portion 102) of the present embodiment using a pair of molds (not illustrated) that are divided into upper and lower portions by using a dividing line B as a boundary. Thus, the manufacturing process can be simplified.

In the present embodiment, the insertion groove 116 may be shaped such that the entire bottom surface of a part of the insertion groove 116 can be visually recognized when viewed from one side in the Z-axis direction (second direction) perpendicular to the X-axis direction (first direction) and the entire bottom surface of a remaining part of the insertion groove 116 can be visually recognized when viewed from the other side in the Z-axis direction. According to this cable supporting device, with the absence of an undercut part, the main body can be easily manufactured by pattern drawing.

Further, in the present embodiment, the tubular portion 110 and the stopper 120 are integrally formed of the same material. Therefore, the number of components of the cable supporting device 100 can be reduced as compared with a structure in which the tubular portion 110 and the stopper 120 are separated.

B. Variant Examples

The technology disclosed in this specification is not limited to the embodiment described above, and can be varied in various manners without departing from the scope of its spirit, and for example, the following variations are possible.

The structure of the cable supporting device 100 of the above embodiment is merely exemplary, and various variations are possible. For example, in the above embodiment, the cover portion 102 may have a structure without the hub 130.

In the above embodiment, the winding direction of the guide groove 118 may be the same as the winding direction of the external thread 114 formed on the outer circumferential surface of the tubular portion 110. Further, the shape of the guide groove 118 is not limited to spiral (helical), and may be, for example, a linear shape along the cable insertion direction (the X-axis direction). Further, the tubular portion 110 may have a structure in which the guide groove 118 is not formed.

In the above embodiment, the angle of inclination of the guide groove 118 with respect to the imaginary straight line L (the axis of the through hole 112) may be equal to or greater than the angle of inclination of the external thread 114 (the internal thread 140) with respect to the imaginary straight line L when viewed from a direction (for example, the Y-axis direction) perpendicular to the cable insertion direction (the X-axis direction). Further, the number of windings of the guide groove 118 may be equal to or greater than the number of windings of the external thread 114.

In the above embodiment, the engagement portion of the nut member 104 is exemplified by the slit 142, but is not limited thereto, and a structure is also possible in which the first end portion 160 of the coil spring 106 is engaged by other locking means such as a locking projection. Further, it is sufficient that at least parts of the nut member 104 and the stopper 120 are opposed to each other in the frontward and rearward direction (the X-axis direction).

In the above embodiment, the tubular portion 110 and the stopper 120 may be separated structures which are, for example, screwed with each other.

Further, the material forming the respective members constituting the cable supporting device 100 of the above embodiment are merely exemplary, and the respective members may be formed of other materials.

In the above embodiment, the cable supported by the cable supporting device 100 is exemplified by a transmission cable (the cable 1) for a vehicle, but is not limited thereto, and the cable may be, for example, other cable for remote operation (a parking brake cable, a hood cable, a fuel lid cable, a luggage cable, or the like). Further, in the above embodiment, the shape of the recess 610 of the bracket 600 to which the cable supporting device 100 is mounted is a shape including the mounting recess 612 and the guiding recess 614, but is not limited thereto, and may be other shape, and for example, may be a shape in which the width between a pair of opposing portions 620 constituting the guiding recess 614 (an opening width of the recess 610 in the Y-axis direction) is substantially the same as the diameter of the mounting recess 612.

The technology disclosed in this specification can be implemented in various ways, and for example can be implemented in the form of a cable supporting device or a cable supporting method or the like.

In addition, in this specification, the term "perpendicular" not only means perpendicularity (90 degrees) in a strict sense, but also includes cases where there is an error of about ±5 degrees with respect to 90 degrees. In addition, the term "opposed" not only means that two members are directly opposed to each other without another member therebetween, but also includes a case where two members are opposed to each other with another member therebetween.

The invention claimed is:

1. A cable supporting device for supporting a cable, comprising:
a main body comprising a tubular portion, wherein a through hole, which extends in a first direction and into which the cable is inserted, is formed in the tubular portion, and an external thread is formed on a part of an outer circumferential surface of the tubular portion;
an annular nut member, wherein an internal thread screwed with the external thread formed on the tubular portion is formed on an inner circumferential surface of the annular nut member;
a stopper arranged on one side in the first direction with respect to the external thread formed on the tubular portion, and opposed to the nut member in the first direction; and
a coil spring arranged in such a manner that the tubular portion is received on an inner circumferential side of the coil spring, wherein the coil spring applies, to the nut member, a rotational force in a direction toward the stopper,
wherein,
an engagement portion that engages a first end portion of the coil spring is formed in the nut member;
an insertion groove is formed on the outer circumferential surface of the tubular portion and on the other side of the external thread in the first direction, a second end portion of the coil spring on a side opposite to the first end portion is inserted into the insertion groove; and
the insertion groove at least has an abutting surface that abuts against the second end portion of the coil spring when the nut member screwed with the tubular portion is rotated in a direction away from the stopper.

2. The cable supporting device according to claim 1, wherein a guide groove is further formed on the outer circumferential surface of the tubular portion, and the guide groove continuously extends from the insertion groove to the other side of the tubular portion in the first direction and has an opening on the other side.

3. The cable supporting device according to claim 2, wherein the shape of the guide groove is spiral or helical.

4. The cable supporting device according to claim 2, wherein a winding direction of the guide groove is opposite to a winding direction of the external thread formed on the outer circumferential surface of the tubular portion.

5. The cable supporting device according to claim 3, wherein the insertion groove is shaped such that an entire bottom surface of a part of the insertion groove can be visually recognized when viewed from one side in a second direction perpendicular to the first direction and an entire bottom surface of a remaining part of the insertion groove can be visually recognized when viewed from the other side in the second direction.

6. The cable supporting device according to claim 1, wherein the main body and the stopper are integrally formed.

7. The cable supporting device according to claim 3, wherein a winding direction of the guide groove is opposite to a winding direction of the external thread formed on the outer circumferential surface of the tubular portion.

8. The cable supporting device according to claim 4, wherein the insertion groove is shaped such that an entire bottom surface of a part of the insertion groove can be visually recognized when viewed from one side in a second direction perpendicular to the first direction and an entire bottom surface of a remaining part of the insertion groove can be visually recognized when viewed from the other side in the second direction.

9. The cable supporting device according to claim 7, wherein the insertion groove is shaped such that an entire bottom surface of a part of the insertion groove can be visually recognized when viewed from one side in a second direction perpendicular to the first direction and an entire bottom surface of a remaining part of the insertion groove can be visually recognized when viewed from the other side in the second direction.

10. The cable supporting device according to claim 2, wherein the main body and the stopper are integrally formed.

11. The cable supporting device according to claim 3, wherein the main body and the stopper are integrally formed.

12. The cable supporting device according to claim 4, wherein the main body and the stopper are integrally formed.

13. The cable supporting device according to claim 5, wherein the main body and the stopper are integrally formed.

14. The cable supporting device according to claim 7, wherein the main body and the stopper are integrally formed.

15. The cable supporting device according to claim 8, wherein the main body and the stopper are integrally formed.

16. The cable supporting device according to claim 9, wherein the main body and the stopper are integrally formed.

* * * * *